(12) United States Patent
Jourtchenko et al.

(10) Patent No.: US 6,434,840 B1
(45) Date of Patent: Aug. 20, 2002

(54) DEVICE, IN PARTICULAR A WORK TABLE FOR A PROJECTOR

(76) Inventors: Juri F. Jourtchenko, Uliza Karbischeva, 23-1-10, 143400, Krasnogorsk; Vladimir K. Belyakov, Prospekt Lenina, 53-57, 143900, Balaschicha, both of (RU)

( * ) Notice: Subject to any disclaimer, the term of this patent is extended or adjusted under 35 U.S.C. 154(b) by 0 days.

(21) Appl. No.: 09/559,516

(22) Filed: Apr. 27, 2000

(30) Foreign Application Priority Data

Apr. 28, 1999 (DE) .................................. 299 07 533 U

(51) Int. Cl.⁷ .............................. G01B 5/00; B23Q 3/00
(52) U.S. Cl. .................................... 33/1 M; 33/568
(58) Field of Search ..................... 33/1 M, 568, 569, 33/573

(56) References Cited

U.S. PATENT DOCUMENTS

| | | | | |
|---|---|---|---|---|
| 2,676,414 A | * | 4/1954 | Derry | 33/569 |
| 3,155,383 A | * | 11/1964 | Whitmore | 33/1 M |
| 3,744,902 A | * | 7/1973 | Henker | 33/1 M |
| 3,829,978 A | * | 8/1974 | Basin et al. | 33/568 |
| 4,575,942 A | | 3/1986 | Moriyama | 33/1 M |
| 4,667,415 A | * | 5/1987 | Barsky | 33/1 M |

* cited by examiner

Primary Examiner—Christopher W. Fulton
(74) Attorney, Agent, or Firm—Henry M. Feiereisen

(57) ABSTRACT

A high-precision device for providing positioning, registration and displacement includes a two-dimensional table for providing positioning and displacement, and a registration unit for bringing markers into registration with one another. The registration unit is attached to a carriage of the table via flexible articulated supports and can be moved by several, preferably seven, drives. The device can be used as a work table for reduction projectors and scanning electron microscopes, for example for investigating structural properties of materials.

14 Claims, 4 Drawing Sheets

DEVICE, IN PARTICULAR A WORK TABLE FOR A PROJECTOR

CROSS-REFERENCES TO RELATED APPLICATIONS

This application claims the priority of German Patent Application, Serial No. 299 07 533.8, filed Apr. 28, 1999, the subject matter of which is incorporated herein by reference.

BACKGROUND OF THE INVENTION

The present invention relates to a device, in particular a work table for projectors, for providing positioning, registration and displacement, and is useful, in particular, as a work table, for reduction projectors (for example, for electron beam lithography applications or projection mask aligners) and for measuring structural properties using scanning electron microscopes).

High-precision devices providing positioning, registration and displacement in electron beam lithography and scanning electron microscope applications require a positioning and registration accuracy in the order of 0.001 microns. A device for positioning, registration and displacement is disclosed in U.S. Pat. No. 4,575,942 and includes a four-stage design. Instead of the conventional two-dimensional device for precise positioning along the X axis and Y axis, a precision plate is employed which is held on a coarse carriage by flexible attachments and is moved by at least three linear drives. This design is quite complex.

SUMMARY OF THE INVENTION

It is thus an object of the present invention to provide an improved displacement device, obviating the afore-stated drawbacks.

In particular, it is an object of the present invention to provide an improved displacement device which is simple in construction and yet is capable to provide a displacement device operating in two directions, while allowing a precise measurement of the distance and size of the area.

These objects, and others which will become apparent hereinafter, are attained in accordance with the present invention by providing a two-dimensional table to provide positioning and displacement, and a registration unit for providing registration between markers, with the registration unit supported on a carriage of the table via flexible articulated supports and movable by a plurality of drives, preferably by seven drives.

According to another aspect of the invention, a bi-level device is provided which includes a first level (first stage—a high-precision dimensional table comprised of a device for linear displacement with flexible elements) and a second level (second stage—a high-precision six-stage device which enables displacement in the coordinate directions X, Y, Z, OX, OY, OZ).

The present invention realizes a high-precision device for providing positioning, registration and displacement in two directions, which, instead of the conventional two-dimensional device for precise positioning along the X and Y directions, employs an additional 6-stage device which is supported by one of the carriages of the dimensional moving table by pivot bearings, and is moved by at least seven linear drives.

According to another feature of the present invention, the two-dimensional table is designed for linear displacements in two directions and includes drives having flexible elements to provide displacement and positioning in these two directions.

Suitably, the device for registering and adjusting allows high-precision displacements and motion reversal of the dimensional table in three coordinate axes.

According to another feature of the present invention, an attachment device which preferably includes the four flexible joints to which a moveable frame and a base plate are attached, is provided on the at least one carriage of the two-dimensional table.

The drives may be implemented in form of identical linear electric drives adapted to move the dimensional table together with a plate, which is mounted on the table, with high precision in six coordinates X, Y, Z and OX, OY and OZ. Suitably, two of the seven linear drives together with a moveable lower frame and the base plate form the device which provides high-precision displacement in the X and Y directions. Three of the seven linear drives may be secured to the base plate and activate the motion of the upper moveable frame, thereby providing a device with extremely precise displacement along the Z axis and tilt about the axes OX, OY. Two of the seven drives may be secured to the upper moveable frame, representing a table with reversible movement about the OZ axis.

Preferably, the linear drives have an electric motor and a three-stage lever gear.

According to another feature of the present invention, the overall transmission ratio of a link gear mechanism is five hundred. Preferably, two displacement sensors are arranged on an input drum and an output drum of the gear mechanism. One of the sensors may be designed for controlling the drive via the electric motor, while the other sensor may be designed to measure and indicate the reversing angle of the working element of the device.

According to another feature of the present invention, the two one-dimensional devices may be provided with multi-track slideways for a plurality of balls which are separated by spacers.

The device according to the present invention may further include a frame made of an upper and a lower moveable frame section, a base plate, and a work table on which a sample to be measured is placed. The work table can be displaced with the linear electric drives in the coordinate directions X, Y, Z and rotated about the axes OX, OY and OZ.

BRIEF DESCRIPTION OF THE DRAWING

The above and other objects, features and advantages of the present invention will be more readily apparent upon reading the following description of a preferred exemplified embodiment of the invention with reference to the accompanying drawing, in which.

DETAILED DESCRIPTION OF PREFERRED EMBODIMENTS

Figure 1:
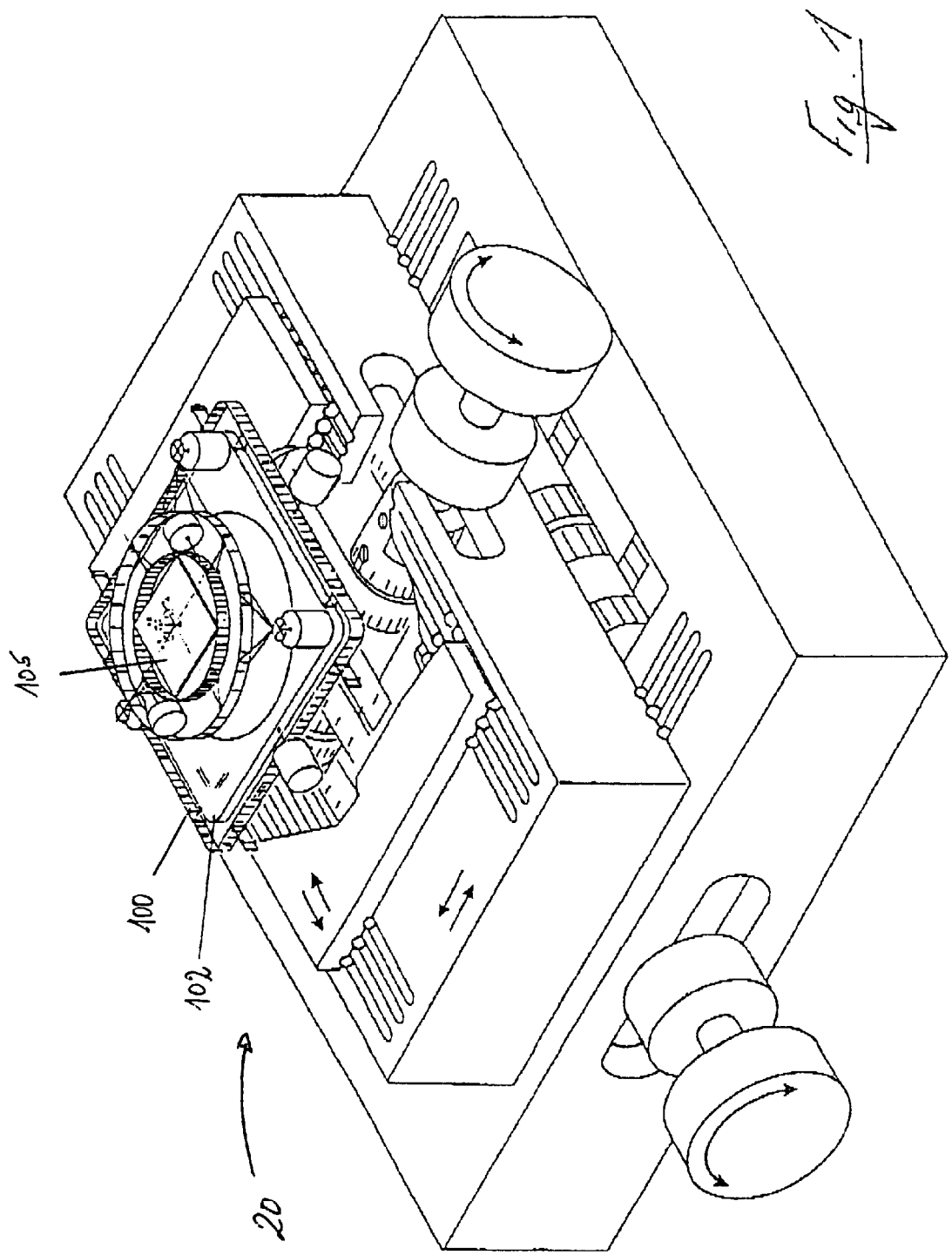
FIG. 1 is a perspective view of a device according to the present invention.

Throughout all the Figures, same or corresponding elements are generally indicated by same reference numerals.

Turning now to the drawing, and in particular to FIG. 1, there is shown a perspective view of a device according to the present invention, generally designated by reference numeral 20 and including a two-dimensional table providing positioning, registration and displacement in two dimensions and constructed in the form of two identical one-dimensional linear displacement devices having flexible elements.

The device for providing positioning, registration and displacement in a first direction is mounted on the moveable section of the device, with positioning in the other direction oriented at an angle of 90° relative to the first direction. The two-dimensional table provides a positioning accuracy for the displacement of the 6-stage device along the coordinates X, Y of ±0.1 microns for distances of ±100 mm.

Figure 2:
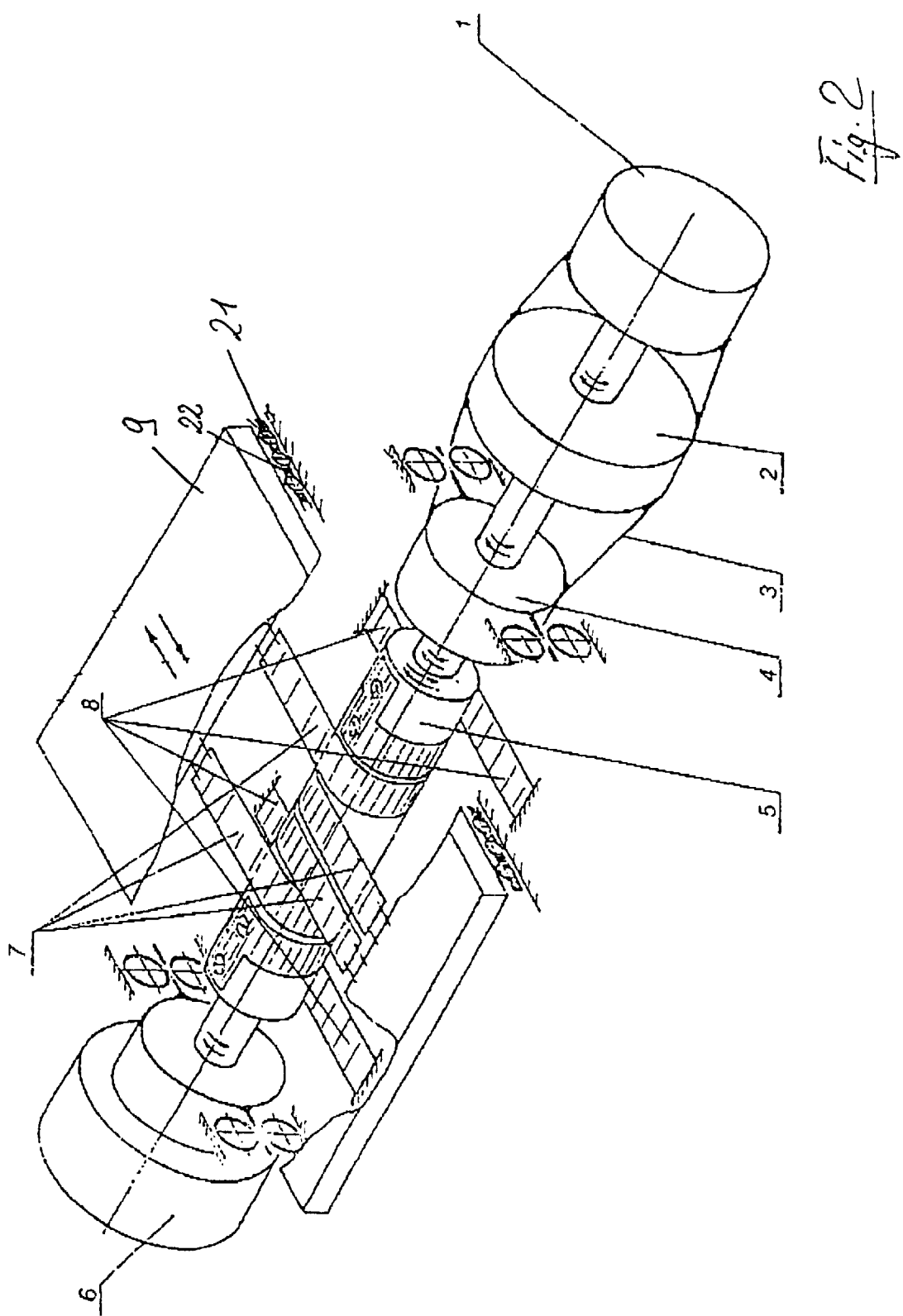
FIG. 2 is a perspective cutaway view, on an enlarged scale, showing details of the device of FIG. 1.

FIG. 2 shows the mechanical drive system for one of the coordinates of the first stage. A particular feature of the kinematics of the mechanical drive is the presence of two displacement sensors 2, 6 placed at the input and output drums 5 of the reduction gear 4. The sensor 2 is used to control the drive via an electric motor 1, while the sensor 6 is used to indicate the rotation angle directly on the working element 9 of the device. It is assumed that the pretensioned non-deformable flexible elements 7, 8 of the band reduction gear 4 for transmitting the movement from the output drum of the reduction gear 4 to the movable frame 9, which forms the last working element, do not introduce any deviations during transmission of movement.

Each of the two one-dimensional devices includes multi-track slideways with a plurality of balls 21 which are separated by spacers 22. By selecting suitable technical and design parameters, such as the rigidity of each slideway (groove), the flexural characteristics of the base plate and the support for the slideways, the number of balls 21 and the like, a motion linearity with an accuracy of ±0.05 microns can be realized.

The extremely precise device for providing positioning, registration and displacement is implemented as an electro-mechanical device which includes the following components: an upper and a lower moveable frame, a support plate and a table on which a wafer is mounted. These components can be moved along the X, Y and Z coordinates and can be rotated about the OX, OY and OZ axes. The device allows automatic frame-by-frame registration of the marks on the photo mask relative to marks of the wafer in projection lithography (projection laser lithography) and also for duplicating patterns of the chip topography (large and very large area integrated circuits) with extremely high placement accuracy of the micro-elements in the order of 0.01 microns.

Figure 3:
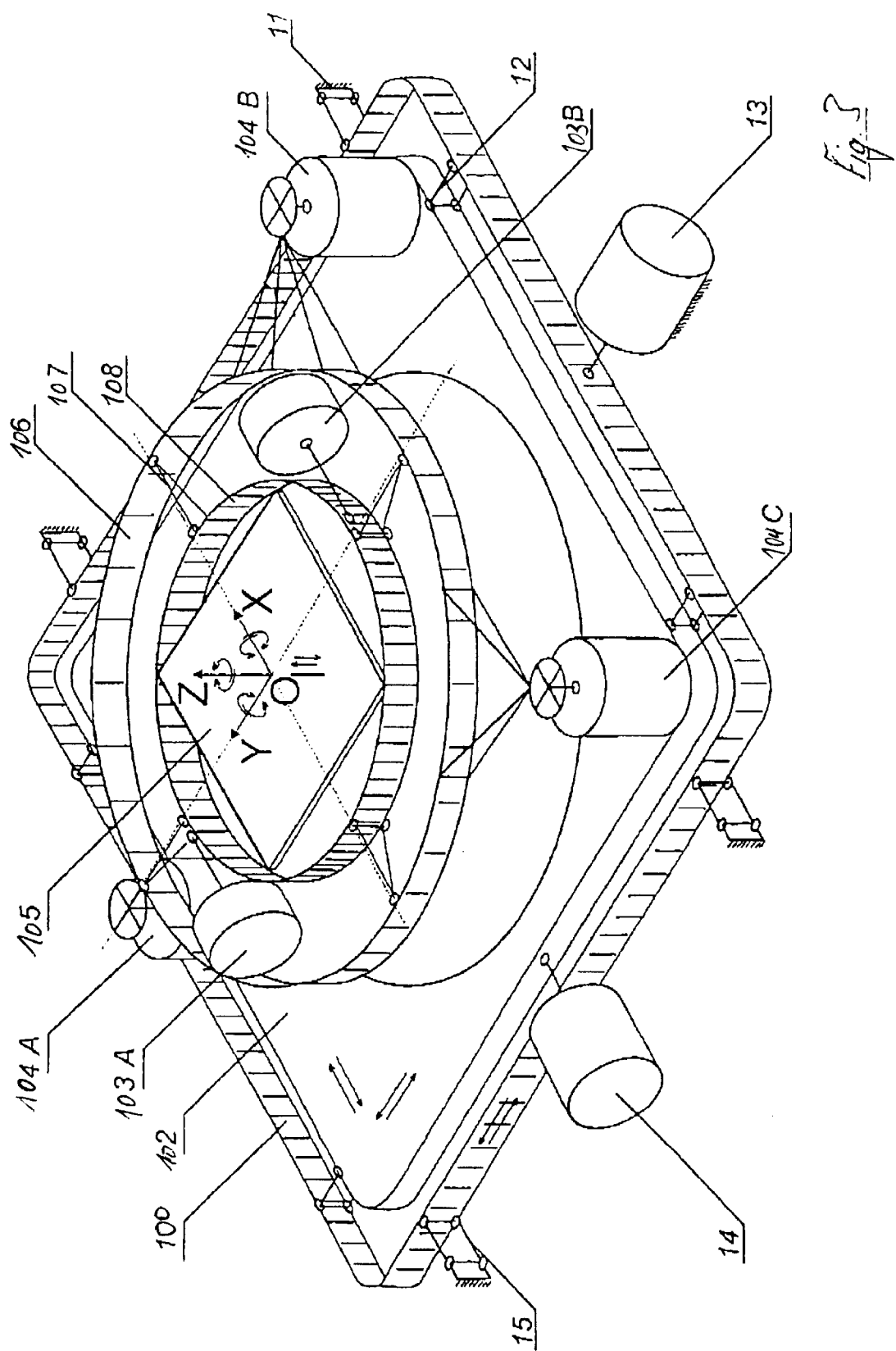
FIG. 3 is another perspective cutaway view, on an enlarged scale, showing details of the device of FIG. 1.

The mechanical arrangement of the device for providing positioning, registration and displacement is illustrated in FIG. 3.

A moveable lower frame 100 is suspended from four flexible connections 15 supported by the stationary posts 11 which are attached to a moveable carriage of the dimensional table. Flexible joints 12 connect the moveable frame 100 to a base plate 102. In this manner, a work table 108 moves together with the base plate 102 and the moveable frame 100 along the Y axis when an electric drive 13 is switched on. Conversely, when an electric drive 14 is switched on, the base plate 102 moves on flexible joints relative to the moveable frame 100 in X direction. The work table 108 together with the plate (mask) 105 move in the plane XOY (horizontal plane) when the electric drives 13, 14 are switched on. The upper moveable frame 106 together with the work table 108 and the plate 105 can be raised and lowered along the Z axis by simultaneously activating all three electric drives located at the positions 104A, 104B, 104C on the base plate 102. The work table 108 together with the plate 105 move in parallel alignment along the Z axis when an identical number of pulses is applied to the electric drives 104A, 104B, 104C. Conversely, the unit of work table 108 and plate 105 rotates about the OX axis when identical control signals are applied to the electric motor 104B and 104C for raising the unit and to electric drive 4A for lowering the unit. The moveable frame together with the work table 108 and the plate 105 will move in the opposite direction when identical control signals are applied to the electric drive 104A for raising the unit and electric drives 104B and 104C for lowering the unit. To rotate the work table 108 with the plate 105 about the Y axis, the signal for a raising operation has to be supplied to the electric drive 104B, with an identical signal supplied to the electric drive 104C for a lowering operation. The electric drive 104A remains stationary thereby. In this case, the frame 106 together with the work table 108 and the plate 105 rotate about the OY axis. When the electric drives 104B and 104C are reversed, the rotation direction about the OY axis is also reversed. To rotate the work table 108 with the plate 105 about the OZ axis, signals to extend rods are supplied to electric drives 103A and 103B. In this case, the work table 108 together with the plate 105 rotates on flexible joints 107 about the OZ axis. The work table 108 together with the plate 105 will rotate about the OZ axis in the opposite direction when the electric drives 103A and 103B are reversed. In this way, the surface of the plate 105 is automatically aligned in the image plane of the optical system (the marks register with each other).

All seven linear electric drives 13, 14, 104A, 104B, 104C, 103A, 103B in the registration system are constructed in the same manner. Since all moveable elements in this device are rigidly coupled with each other and all displacements are supported by flexible joints, the work table 108 with the photolithographicplate 105 is moved free from play in each of the indicated directions.

Figure 4:
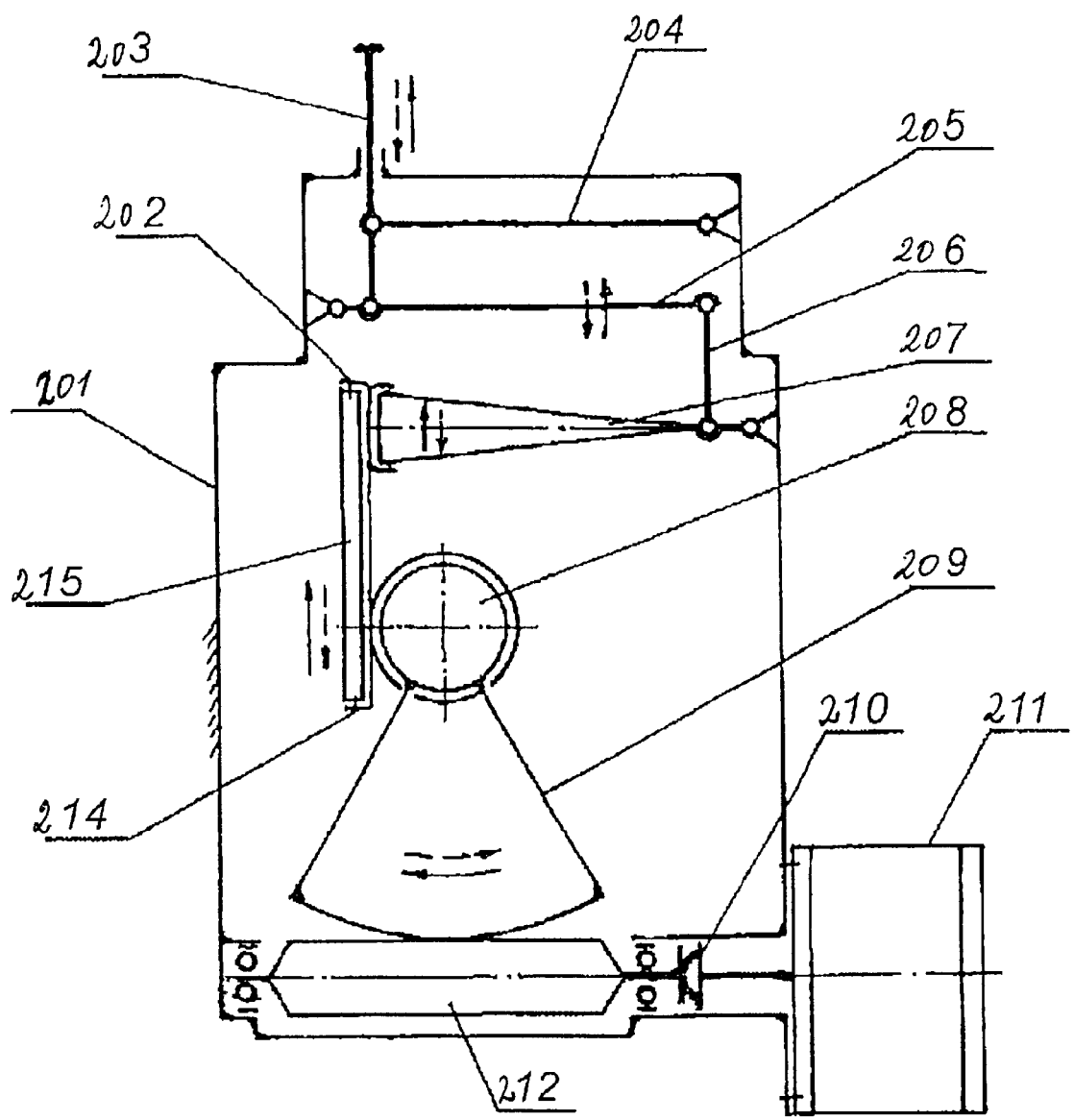
FIG. 4 shows a mechanical drive system for the device of the present invention.

In the following, the design of the high-precision electric drives for providing linear movement will now be described. The mechanical arrangement is illustrated in FIG. 4. The electric drive is designed as a three-stage linkage gear mechanism disposed in a stationary housing 201. The gear mechanism includes a worm gear 209, a roller 208, a band 214, a rail 215, a band 202 and a lever 207 forming the first stage of the link system. The lever 207, a rod 206 and a lever 205 form the second stage, and the lever 205 and a rod 203 form the third output stage of the link system. An auxiliary lever 204 transmits the linear displacement to an output rod. Assuming that the gear ratio of the first stage is equal to 5, of the second stage equal to 10 and of the third stage equal to 10, the overall gear ratio of the link system is equal to 500. Assuming that the gear ratio of the worm gear for a one-way worm is equal to 100 and the sector of the worm gear 209 has an acute angle of 60°, the output rod is displaced by 30 nm if the electric motor is rotated by 1.8°. When the sector of the worm gear 209 rotates by 60°, the worm 212 rotates 16.6 times, so that the output element is displaced by 0.1 mm. When electric motor 211 is activated, the rotation is transmitted by an articulated bushing 210 to the worm 212. The worm gear 209 transmits the rotation to the roller 8, which rotates (in the direction of the arrow) so as to take up the band 214 and to unwind the band 202. The rail 215 is thus moved upwardly and rotates the lever 207 which in turn rotates the lever 205 via the rod 206. During the rotation of the lever 205, the rod 203 (output element) is displaced upwardly. The output element. 203 rotates in the opposite direction when the rotation direction of the electric motor 211 is reversed. To eliminate play in the worm gear 209, the sector of the worm gear 209 is slotted and includes the bands 214 which are tensioned on the rails 215. The operating surfaces of the sectors of the worm gear 209 are pressed against the operating surfaces of the worm 212. All joints of the link system are flexible, with the flexible elements coupled to one another. Accordingly, the electric drive eliminates play.

Thus, a high-precision device is realized for adjusting, registering and shifting, in particular as work table for projectors for reduced images, for electron beam lithography applications as well as for measuring structural properties using scanning electron microscopes. The device for providing positioning, registration and displacement is implemented as an electromechanical device in which the components can be moved in X, Y and Z directions and reversed about the OX, OY and OZ axes at a magnitude of 0.01 microns at distances of +0.1 mm.

While the invention has been illustrated and described as embodied in a device, in particular a work table for a projector, it is not intended to be limited to the details shown since various modifications and structural changes may be made without departing in any way from the spirit of the present invention.

What is claimed as new and desired to be protected by Letters Patent is set forth in the appended claims:

1. A device, in particular a work table for projectors, for providing positioning, displacement and registration of markers, comprising:
   a two-dimensional table having a carriage;
   a registration unit, supported by first flexible articulated supports on the
   carriage, for bringing the markers into registration; and
   a drive mechanism, including seven drives, for moving the registration unit.

2. The device of claim 1, wherein the two-dimensional table is designed for displacement in two directions and wherein the drives include flexible elements for displacement and positioning in these two directions.

3. The device of claim 2, wherein the apparatus comprises at least two one-dimensional displacement and positioning devices having multi-track slideways and a plurality of balls separated by spacers.

4. The device of claim 1, wherein the registration unit is adapted for high-precision movement and a reversal in three directions relative to the table.

5. The device of claim 1, wherein the carriage comprises a moveable frame and a base plate and second flexible articulated support members connecting the moveable frame and the base plate.

6. The device of claim 5, wherein the moveable frame has a lower frame section, wherein two of the seven drives together with the lower frame section and the base plate form a unit for high precision movements in X and Y directions.

7. The device of claim 5, wherein the moveable frame has an upper frame section, and wherein three of the seven drives are attached to the base plate for moving the upper frame section, thereby forming a unit for hig-precision movements in Z direction and tilts about the OX and OY axes.

8. The device of claim 5, wherein the frame has an upper frame section, and wherein two of the seven linear drives are attached to the upper frame section, thereby forming a turntable rotating about the OZ axis.

9. The device of claim 1, wherein the drive mechanism includes identical linear electric drives capable of moving the table together with a plate, attached to the table, at high precision in six directions X, Y, Z, OX, OY, OZ.

10. The device of claim 1, wherein the drive mechanism includes an electric motor and a three-stage linkage gear mechanism.

11. The device of claim 10, wherein the gear mechanism has a gear ratio of approximately 500.

12. The device of claim 1, wherein a drive of the drive mechanism includes a gear with a shaft, the shaft having an input drum and an output drum and two displacement sensors, with one of the displacement sensors disposed on the input cylinder and the other displacement sensors disposed on the output cylinder.

13. The device of claim 12, wherein one of the two sensors is designed for controlling the drive from the electric motor and the second of the two sensors is designed to indicate the rotation angle of a working element of the device.

14. The device of claim 1, and further comprising a frame including an upper frame section and a moveable lower frame section, a base plate, and a table for supporting a workpiece, with the table movable along the X, Y and Z directions and rotatable about the OX, OY and OZ axes.

* * * * *